United States Patent
Bassov

(10) Patent No.: US 10,013,425 B1
(45) Date of Patent: Jul. 3, 2018

(54) SPACE-EFFICIENT PERSISTENT BLOCK RESERVATION OPTIMIZED FOR COMPRESSION

(71) Applicant: EMC IP Holding Company LLC, Hopkinton, MA (US)

(72) Inventor: Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 299 days.

(21) Appl. No.: 15/086,751

(22) Filed: Mar. 31, 2016

(51) Int. Cl.
  *G06F 17/30* (2006.01)
  *G06F 3/06* (2006.01)

(52) U.S. Cl.
  CPC ...... *G06F 17/30138* (2013.01); *G06F 3/0604* (2013.01); *G06F 3/0643* (2013.01); *G06F 3/0689* (2013.01); *G06F 17/30088* (2013.01)

(58) Field of Classification Search
  CPC ........... G06F 17/30138; G06F 3/30689; G06F 3/0643; G06F 17/30088; G06F 3/0604; G06F 3/0665; G06F 9/30141; G06F 2211/1021; G06F 2212/461; G06F 17/302; G06F 8/4434; G06F 17/30153; G06F 2211/1014
  USPC .................. 707/823, 812, 791, 802, 999.101
  See application file for complete search history.

(56) References Cited

U.S. PATENT DOCUMENTS

| | | | | |
|---|---|---|---|---|
| 7,496,586 B1 * | 2/2009 | Bonwick | ........... | G06F 17/30067 |
| 8,140,821 B1 * | 3/2012 | Raizen | ................ | G06F 11/1448 |
| | | | | 707/637 |
| 8,407,265 B1 * | 3/2013 | Scheer | .............. | G06F 17/30138 |
| | | | | 707/823 |
| 8,688,908 B1 * | 4/2014 | Kopylovitz | ........... | G06F 3/0608 |
| | | | | 711/114 |
| 9,274,708 B2 * | 3/2016 | Goodman | .............. | G06F 3/0655 |
| 9,400,792 B1 * | 7/2016 | Bono | ................ | G06F 17/30082 |
| 9,436,399 B2 * | 9/2016 | Garson | ................ | G06F 12/023 |
| 9,696,906 B1 | 7/2017 | Bassov et al. | | |
| 9,747,199 B2 * | 8/2017 | Patil | ...................... | G06F 12/023 |
| 9,846,544 B1 | 12/2017 | Bassov | | |
| 2007/0260830 A1 * | 11/2007 | Faibish | ................... | G06F 3/061 |
| | | | | 711/162 |
| 2008/0189342 A1 * | 8/2008 | Bhattacharya | .... | G06F 17/30067 |

(Continued)

OTHER PUBLICATIONS

Ivan Bassov; "Space-Efficient Persistent Block Reservation," U.S. Appl. No. 15/085,541, filed Mar. 30, 2016.

*Primary Examiner* — Mohammed R Uddin
(74) *Attorney, Agent, or Firm* — BainwoodHuang

(57) ABSTRACT

A method of operating a DSS to provision space on a volume on which a filesystem and its snapshots rest, having thin and thick files. It includes (a) receiving a reservation-altering storage command, (b) calculating a volume liability by summing together (1) a total number of allocated data blocks stored on the volume and (2) a maximum value, over each of the filesystem and the snapshots, of a difference between (A) a count of guaranteed thick blocks for that filesystem or snapshot based on a count received from the filesystem including a sum, over each thick file on the filesystem, of data blocks guaranteed to that file and (B) a number of uncompressed mapped data blocks marked as thick by the filesystem for that filesystem or snapshot, and (c) providing a number of blocks of backing store for the volume equal to at least the calculated volume liability.

11 Claims, 5 Drawing Sheets

(56) References Cited

U.S. PATENT DOCUMENTS

| | | | |
|---|---|---|---|
| 2013/0227236 A1* | 8/2013 | Flynn | G11C 16/26 |
| | | | 711/165 |
| 2013/0246702 A1* | 9/2013 | Shigeta | G06F 12/0223 |
| | | | 711/112 |
| 2016/0026501 A1 | 1/2016 | Polkovnikov et al. | |
| 2016/0217078 A1* | 7/2016 | Chen | G06F 12/0871 |
| 2016/0277233 A1 | 9/2016 | Kozlovsky | |
| 2016/0350021 A1* | 12/2016 | Matsushita | G06F 12/0873 |
| 2017/0060918 A1* | 3/2017 | Iyer | G06F 21/6218 |
| 2017/0199674 A1* | 7/2017 | Delgado | G06F 3/0608 |

\* cited by examiner

US 10,013,425 B1

SPACE-EFFICIENT PERSISTENT BLOCK RESERVATION OPTIMIZED FOR COMPRESSION

BACKGROUND

Data storage systems (DSSes) store large quantities of data logically arranged onto many logical disks accessible to host devices. Traditional DSSes assigned each logical disk a size at creation time, allocating space from physical storage at that time in what is known as "thick provisioning." Some newer DSSes allow logical disks to be thinly-provisioned by dynamically assigning more or less underlying physical storage to the logical disks as needed.

Some newer DSSes create and manage filesystems on all or some of their logical disks. Traditionally these filesystems were thickly-provisioned as well. Even when a filesystem is thickly-provisioned, however, the size of its underlying storage may vary as new files are created and resized. In addition, in more complex filesystems that share blocks between several files, the amount of underlying storage that is required may vary as files are written to, even when they are not being resized. In addition, in some newer systems, filesystems may also be thinly-provisioned.

SUMMARY

Unfortunately, thickly-provisioned filesystems utilizing shared blocks are very difficult to provision correctly. This problem is exacerbated when attempting to create a hybrid thick/thin filesystem in which some files are provisioned thinly, while other files are provisioned thickly, using a technique referred to as Persistent Block Reservation (PBR). A simplistic approach may commonly over-provision storage to filesystems employing PBR. In addition, a simplistic approach may not be usable in systems that employ inline data compression.

Thus, it would be desirable to provide techniques for more efficiently provisioning storage to filesystems employing PBR without wasting space. It would further be desirable for these techniques to work in conjunction with inline data compression. These goals may be accomplished by summing a number of allocated blocks with a maximum PBR liability for a primary filesystem or any of its snapshots and using that value to efficiently reserve space on a logical volume for the primary filesystem and its snapshots.

In one embodiment, a method is provided of operating a data storage system to provision space on a volume on which a filesystem and a set of snapshots of the filesystem rest, the filesystem including both files marked as thick and files marked as thin. The method includes (a) receiving from the filesystem, by a volume management application operating on the DSS, a reservation-altering storage command, (b) in response to receiving the reservation-altering storage command, calculating, by the volume management application operating on the DSS, a volume liability value by summing together (1) a total number of allocated data blocks stored on the volume and (2) a maximum value, over each of the filesystem and the set of snapshots, of a difference between (A) a count of guaranteed thick blocks for that respective filesystem or snapshot, the count of guaranteed thick blocks for that respective filesystem or snapshot being based on a count of guaranteed thick blocks received from the filesystem, the count of guaranteed thick blocks including a sum, over each file marked as thick on the filesystem, of data blocks guaranteed to that file based on a filesize of that file and (B) a number of uncompressed mapped data blocks marked as thick by the filesystem for that respective filesystem or snapshot, and (c) providing, by the volume management application operating on the DSS, a number of blocks of backing store for the volume equal to at least the calculated volume liability value. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for more efficiently provisioning storage to filesystems employing Persistent Block Reservation (PBR) without wasting space. It would further be desirable for these techniques to work in conjunction with inline data compression. These goals may be accomplished by summing a number of allocated blocks with a maximum PBR liability for a primary filesystem or any of its snapshots and using that value to efficiently reserve space on a logical volume for the primary filesystem and its snapshots.

Figure 1:
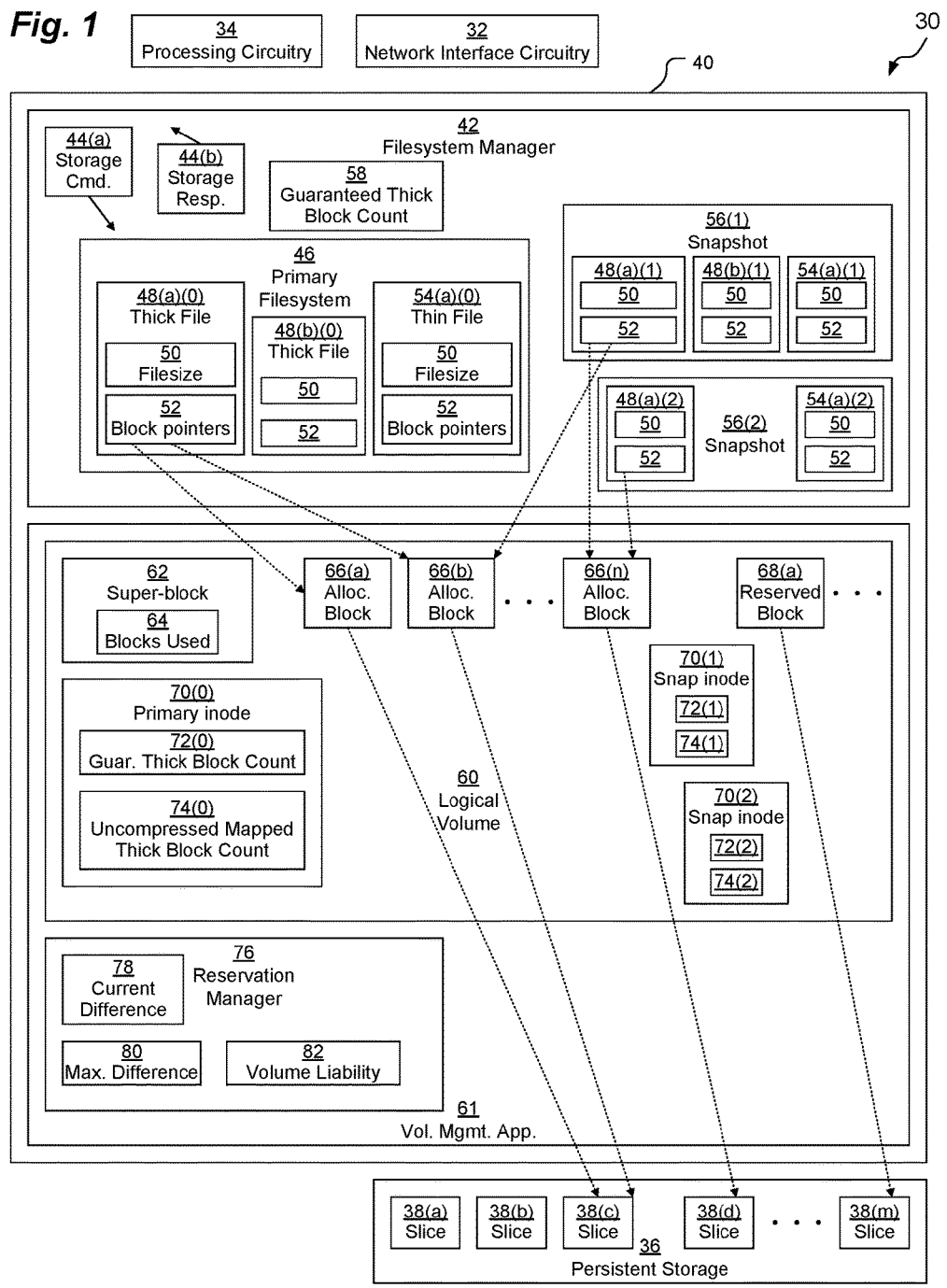
FIG. 1 is a block diagram depicting an example system and apparatus for use in connection with various embodiments.

FIG. 1 depicts a data storage system (DSS) 30. DSS 30 is a computing device, having network interface circuitry 32, processing circuitry 34, persistent storage 36, and memory 40. DSS 30 may be any kind of computing device, such as, for example, a personal computer, workstation, server computer, enterprise server, laptop computer, tablet computer, smart phone, mobile computer, etc. or combinations thereof. Typically, a DSS 30 is a cabinet-mounted device having two or more storage processors (not depicted) configured to access the persistent storage 36. In a typical arrangement, a storage processor is configured as a board or enclosure mounted within a rack connected to persistent storage 36 also mounted within the rack. These components, in combination, may make up DSS 30.

Network interface circuitry 32 may include one or more Ethernet cards, cellular modems, Fibre Channel (FC) adapters, Wireless Fidelity (Wi-Fi) wireless networking adapters, and other devices for connecting to a network, such as a storage area network (SAN), local area network (LAN), wide area network (WAN), cellular data network, etc. In some arrangements, network interface circuitry 32 is communicates with a set of hosts (not depicted), which send data storage commands 44(a) to DSS 30 in order to read from and write to persistent storage 36.

Persistent storage 36 may include one or more of any kind of storage device (not depicted) able to persistently store data, such as, for example, a magnetic hard disk drive, a solid state storage device (SSD), etc. Persistent storage 36 may be arranged as a plurality of RAID groups (not depicted), each made up of one or more storage devices, which may logically combine to create a logical disk (not depicted) having larger size or redundancy features or both, depending on the RAID level, as is well-known in the art. In some embodiments, each logical disk is partitioned into one or more slices 38 (depicted as slices 38(a), 38(b), 38(c), 38(d), . . . , 38(m)). The slices 38 from all logical disks thus forms a pool of slices 38 available for allocation to logical volumes 60. The size of a slice 38 may vary, but in one embodiment, a slice is 256 megabytes, while in another embodiment, a slice is 1 gigabyte.

Processing circuitry 34 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 40 may be any kind of digital system memory, such as, for example, random access memory (RAM). Memory 48 stores one or more operating systems in operation (not depicted, e.g., Linux, UNIX, Windows, MacOS, or a similar operating system), various applications executing on processing circuitry 34 (e.g., filesystem manager 42, volume management application 61 and its constituent reservation manager 76, etc.) as well as data used by those applications. Memory 40 may also store in-memory representations of one or more mounted logical volumes 60 and a primary filesystem 46 and a set of snapshots 56 (depicted as snapshots 56(1), 56(2)) resting on one or more of the mounted logical volumes 60.

A logical volume 60 is a logical disk object upon which a primary filesystem 46 and one or more of its associated snapshots 56 may rest. In some embodiments, a logical volume 60 may be arranged as a sparse filesystem (e.g., the Container Block Filesystem of the EMC Corporation of Hopkinton, Mass.) having a super-block 62 and files (not depicted). Each file of the sparse filesystem represents a primary filesystem 46 or a particular snapshot 56 that rests on that logical volume 60. There is an inode 70 for each such file as well as indirect blocks (not depicted) that point to particular allocated blocks 66 of the sparse filesystem that are assigned to particular such files. As depicted, primary inode 70(0) contains metadata for a file that represents primary filesystem 46, Snap inode 70(1) contains metadata for a file that represents most-recent Snapshot 56(1), and Snap inode 70(2) contains metadata for a file that represents oldest Snapshot 56(2). It should be understood that, although two Snapshots 56(1), 56(2) (and associated Snap inodes 70(1), 70(2)) are depicted, there may be any number of them associated with the primary filesystem 46. There is a volume management application 61 that makes each file of the logical volume appear to the filesystem manager 42 as a volume, the volume management application 61 also taking care of snapshotting. In these embodiments, each logical volume 60 is assigned one or more slices 38 from the pool of persistent storage 36 as backing store. The slices 38 map to logical addresses in the sparse address space of the filesystem of the logical volume 60. Thus, for example, as depicted, both allocated blocks 66(a) and 66(b) are drawn from slice 38(c), while allocated block 66(n) is drawn from slice 38(d). Logical volume 60 may also include reserved blocks 68 in its sparse address space that are not yet assigned to particular files. As depicted, reserved block 68(a) is drawn from slice 38(m). Super-block 62 stores a count of blocks used 64, which represents how many allocated blocks 66 there are within the sparse filesystem (but excluding reserved blocks 68).

Although logical volume 60 has been shown and described as being a Container Block Filesystem, other arrangements are also possible. Thus, it is possible for logical volume 60 to be a volume having an expandable size but storing representations of primary filesystem 46 and its snapshots 56 in a manner other than as files.

A primary filesystem 46 is a filesystem that is accessible and viewable by a host. Writes can be made to a primary filesystem 46. A snapshot 56 represents a prior state of a primary filesystem 46 at a particular moment in time. Snapshots 56 may be created or deleted, but they are generally not written to. It is possible, however, to re-mount a snapshot 56t as a new primary filesystem 46, effectively rolling back subsequent changes made to the primary filesystem 46.

Each of primary filesystem 46 and its Snapshots 56 includes one or more thick files 48 and thin files 54. Each file 48, 54 includes metadata including a marker indicating whether it is a thick file 48 or a thin file 54. This indication encodes Persistent Block Reservation into the filesystem manager 42.

The metadata of each file 48, 54 also includes a filesize attribute 50, which indicates the size of that file 48, 54. Filesize 50 may be given in various ways, such as, for example, in bytes or blocks. For a thin file 54, the filesize 50 represents data of that file 54 that has already been written as well as, in some embodiments, holes within that file 54 that may or may not be fillable, depending on storage availability. However, for a thick file 48, the filesize 50 represents the maximum amount of space reserved for that file 48 even if only a smaller amount has already been written.

The metadata of each file 48, 54 also includes a set of block pointers 52. These block pointers 52 point to particular allocated blocks of the logical volume 60 (although, in some embodiments, there may some re-mapping done) as is well-known in the art. In some embodiments, the block pointers 52 may include some direct block pointers in an inode (not depicted) of the file 48, 54 as well as some block pointers in indirect blocks (not depicted) of the file 48, 54.

Thus, for example, as depicted, thick file 48(a)(0) of primary filesystem 46 has a first block pointer 52 for a first address within the file 48(a)(0) point to allocated block 66(a) of the logical volume 60 and a second block pointer 52 for a second address within the file 48(a)(0) point to allocated block 66(b) of the logical volume 60. The corresponding thick file 48(a)(1) on snapshot 56(1) represents a prior state of the file 48(a)(0). A block pointer 52 for the second address within the file 69(d) point to the same allocated block 66(b) of the logical volume 60, the data at that second address not having changed between the time of snapshot 56(1) and the current time. However, as depicted, the data at the first address of file 48(a)(0) has changed since snapshot 56(1) was taken, so a block pointer 52 for the first address within the file 48(a)(1) points to a different allocated block 66(n) of the logical volume 60, representing the previous state of the data at that address. The corresponding file 48(a)(2) on snapshot 56(2) represents an even earlier state of the file 48(a)(0). This file 48(a)(2) was shorter than files 48(a)(0), 48(a)(1) not having any data yet stored at the second address. Thus, a block pointer 52 for the first address within the file 48(a)(2) points to the same allocated block 66(n) of the logical volume 60 as does the block pointer 52 for the first address within the file 48(a)(1), but the block pointer for the second address of the file 48(a)(2) does not point to any allocated block 66.

As depicted, primary filesystem 46 includes two thick files 48(a)(0), 48(b)(0) and one thin file 54(a)(0), although this is by way of example only. Snapshot 56(1) represents a prior state of the primary filesystem 46 with thick file 48(a)(1) corresponding to thick file 48(a)(0), thick file 48(b)(1) corresponding to thick file 48(b)(0), and thin file 54(a)(1) corresponding to thin file 54(a)(0). Snapshot 56(2) represents an even earlier state of the primary filesystem 46 with thick file 48(a)(2) corresponding to thick file 48(a)(0) and thin file 54(a)(2) corresponding to thin file 54(a)(0), with no previous version of thick file 48(b)(0) having being created yet on snapshot 56(2).

Filesystem manager 42 manages primary filesystem 46, executing storage commands 46(a) received from hosts, issuing read and write requests to the logical volume 60. Filesystem manager 42 also keeps track of a guaranteed thick block count 58 of primary filesystem 46. Whenever the filesize 50 of a thick file 48 of the primary filesystem 46 changes, filesystem manager 42 records the total number of data blocks 66 needed to store all thick files 48 of the primary filesystem 46 if every thick file 48 were to reach the full size permitted by its respective filesize 50. In some embodiments, in addition to the guaranteed thick block count 58, filesystem manager 42 also stores an analogous counter (not depicted) used to store the total number of metadata blocks (e.g., indirect blocks) that may be needed were every thick file 48 to reach its full filesize 50. This approach is useful if data blocks and metadata blocks are tiered on different types of underlying persistent storage 36. In yet other embodiments, filesystem manager 42 combines the total maximum number of data blocks and the total maximum number of metadata blocks into the guaranteed thick block count 58. This approach is useful if data blocks and metadata blocks are tiered together onto a single shared type of underlying persistent storage 36.

A reservation function is performed by the reservation manager 76 of the volume management application 61.

Reservation manager 76 calculates a volume liability 82 for the logical volume 60, representing a minimum amount of underlying storage that must be provisioned to the logical volume 60 (e.g., by assignment of slices 38) in order to be able to fully satisfy all writes to thick files 48 of the primary filesystem 46 that do not require the filesize 50 to increase while maintaining all data already written to both thick files 48 and thin files 54. In addition, logical volume 60 must also be able to mount any Snapshot 56 in place of the primary filesystem 46 and be able to fully satisfy all writes to thick files 48 of that Snapshot 56. Reservation manager 76 therefore requests that the logical volume 60 be provisioned (e.g., by a storage provisioning manager, not depicted) with at least as much storage as the volume liability 82.

In one embodiment, reservation manager 76 calculates volume liability 82 by summing the count of blocks used 64 together with a maximum PBR liability for any of the primary filesystem 46 and its Snapshots 56. Reservation manager 76 calculates this maximum PBR liability by calculating a current difference 78 for each of the primary filesystem 46 and all of its Snapshots 56, storing the maximum such current difference 78 as the maximum difference 80. Reservation manager 76 then sums the maximum difference 80 with the count of blocks used 64 to yield the volume liability 82.

Every time filesystem manager 42 receives a storage command 44(a) that is reservation-altering (see below in connection with FIG. 4), filesystem manager 42 sends guaranteed thick block count 58 down to the logical volume 60. Reservation manager 76 is then able to store the guaranteed thick block count 58 within primary inode 70(0) as guaranteed thick block count 72(0).

In addition, every time filesystem manager 42 receives a storage command 44(a) that is any kind of write command for a block, filesystem manager 42 marks that write command as being addressed to either a thin or thick block upon sending it down to logical volume 60, depending whether it addressed to a thin file 54 or a thick file 48. Reservation manager 76 is then able to update the uncompressed mapped thick block count 74(0) within primary inode 70(0) with reference to what type of write is being performed and whether it is on a thin or thick block.

In addition, whenever there is a command to create a new Snapshot 56, reservation manager 76 copies the current values of 72(0), 74(0) from the primary inode 70(0) to the new inode 70(1), 70(2) for the Snapshot that is being created.

In some embodiments, memory 40 may also include a persistent storage portion (not depicted). Persistent storage portion of memory 40 may be made up of one or more persistent storage devices, such as, for example, hard disk drives, solid-state storage devices, flash drives, etc. Persistent storage of memory 40 is configured to store programs and data even while the DSS 30 is powered off. The OS (e.g., Linux, UNIX, Windows, or a similar operating system) and the applications (e.g., filesystem manager 42, volume management application 61, reservation manager 76, etc.) are typically stored in persistent storage (either persistent storage of memory 40 or in persistent storage 36) so that they may be loaded into a system portion of memory 48 from persistent storage upon a system restart. These applications, when stored in non-transient form either in the volatile portion of memory 40 or in persistent storage, form a computer program product. The processing circuitry 34 running one or more of these applications thus forms a specialized circuit constructed and arranged to carry out the various processes described herein.

Figure 2:
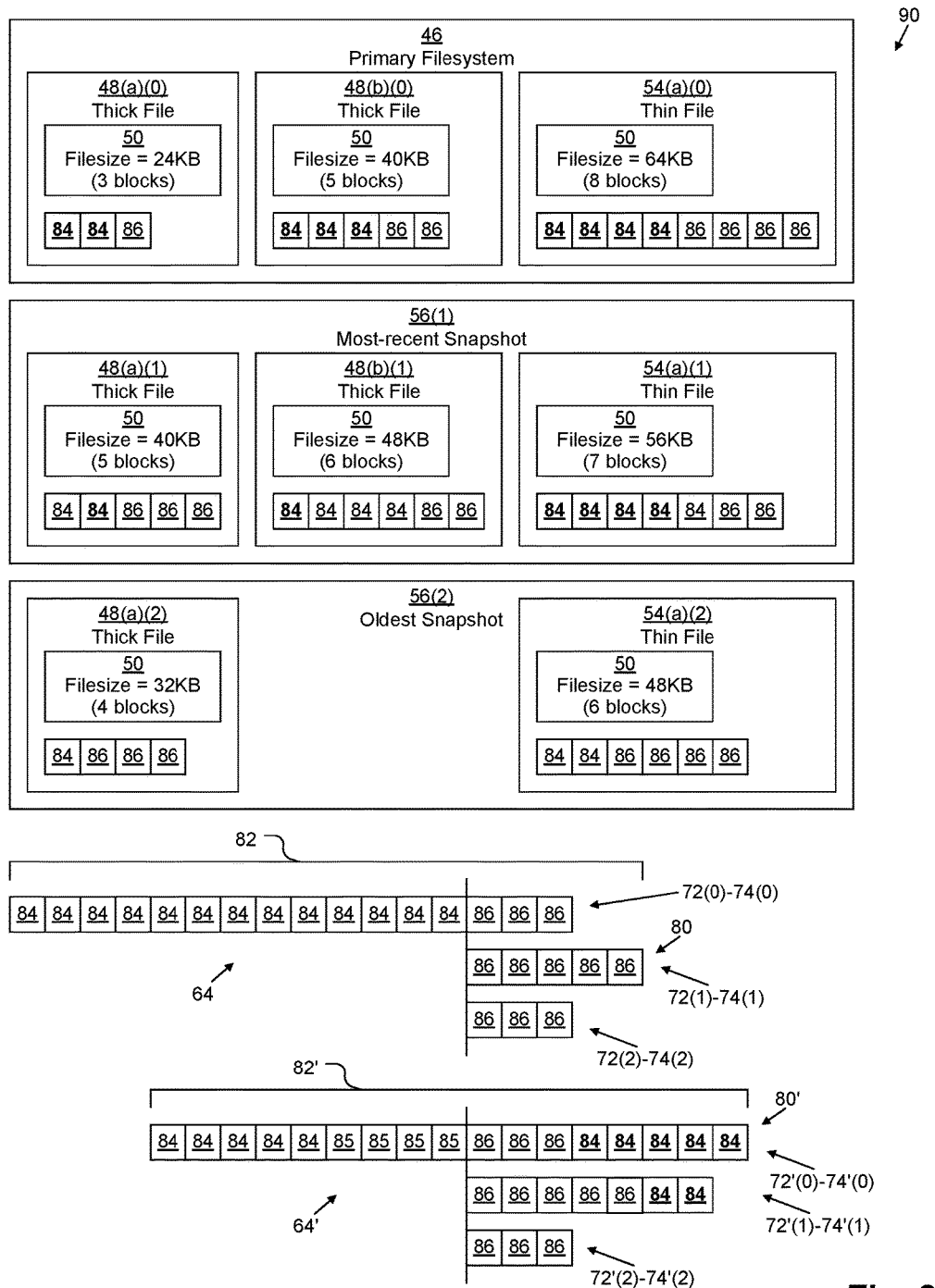
FIG. 2 is a block diagram depicting example file and filesystem layouts and related volume liabilities in connection with various embodiments.

FIG. 2 depicts an example arrangement 100 of data in various thick files 48 and thin files 54 of primary filesystem 46 and its Snapshots 56. FIG. 2 also depicts the calculations used by reservation manager 76 in determining the volume liability 82 both in embodiments without compression and embodiments with compression.

As depicted, oldest Snapshot 56(2) represents an oldest state of primary filesystem 46 at a previous point in time. At that time, thick file 48(a) (depicted as 48(a)(2) in the context of Snapshot 56(2)) had a filesize 50 of 32 kilobytes (KB) (equivalent to 4 8-KB blocks), but only the first block of that file 48(a)(2) had yet been written to, as indicated by the fact that there is one mapped block 84 followed by three unmapped blocks 86. Thick file 48(b) had not yet been created at that time. Finally, at that time, thin file 54(a) (depicted as 54(a)(2) in the context of Snapshot 56(2)) had a filesize 50 of 48 KB (equivalent to 6 8-KB blocks), but only the first two blocks of that file 54(a)(2) had yet been written to, as indicated by the fact that there are two mapped blocks 84 followed by four unmapped blocks 86.

As depicted, most-recent Snapshot 56(1) represents a more recent state of primary filesystem 46 at another point in time. At that time, thick file 48(a) (depicted as 48(a)(1) in the context of Snapshot 56(1)) had an increased filesize 50 of 40 KB (equivalent to 5 8-KB blocks), but only the first two blocks of that file 48(a)(1) had yet been written to, as indicated by the fact that there are two mapped blocks 84 followed by three unmapped blocks 86. Thick file 48(b)

(depicted as 48(b)(1) in the context of Snapshot 56(1)) had a filesize 50 of 48 KB (equivalent to 6 8-KB blocks), but only the first four blocks of that file 48(b)(1) had yet been written to, as indicated by the fact that there are four mapped blocks 84 followed by two unmapped blocks 86. Finally, at that time, thin file 54(a) (depicted as 54(a)(1) in the context of Snapshot 56(1)) had an increased filesize 50 of 56 KB (equivalent to 7 8-KB blocks), but only the first five blocks of that file 54(a)(1) had yet been written to, as indicated by the fact that there are five mapped blocks 84 followed by two unmapped blocks 86.

Primary filesystem 46 is also depicted at the present time. Presently, thick file 48(a) (depicted as 48(a)(0) in the context of primary filesystem 46) has a decreased filesize 50 of 24 KB (equivalent to 3 8-KB blocks), but only the first two blocks of that file 48(a)(1) have currently been written to, as indicated by the fact that there are two mapped block 84 followed by one unmapped blocks 86. Thick file 48(b) (depicted as 48(b)(0) in the context of primary filesystem 46) has a decreased filesize 50 of 40 KB (equivalent to 5 8-KB blocks), but only the first three blocks of that file 48(b)(0) have currently been written to, as indicated by the fact that there are three mapped block 84 followed by two unmapped blocks 86. Finally, thin file 54(a) (depicted as 54(a)(0) in the context of primary filesystem 46) has an increased filesize 50 of 64 KB (equivalent to 8 8-KB blocks), but only the first four blocks of that file 54(a)(0) have currently been written to, as indicated by the fact that there are four mapped blocks 84 followed by four unmapped blocks 86.

In total, in an example embodiment without compression, 13 mapped blocks 84 have been mapped in total, so the stored count of blocks used 64 is 13 blocks, as depicted.

The guaranteed thick block count 72(2) for oldest Snapshot 56(2) is the equivalent number of blocks for the filesize 50 of each thick file 48. Since thick file 48(a)(2) has a filesize 50 equivalent to 4 blocks, the guaranteed thick block count 72(2) is 4.

The guaranteed thick block count 72(1) for most-recent Snapshot 56(1) is the equivalent number of blocks for the filesize 50 of each thick file 48. Since thick file 48(a)(1) has a filesize 50 equivalent to 5 blocks and thick file 48(b)(1) has a filesize 50 equivalent to 6 blocks, the guaranteed thick block count 72(1) is 11.

The guaranteed thick block count 72(0) for primary filesystem 46 is the equivalent number of blocks for the filesize 50 of each thick file 48. Since thick file 48(a)(0) has a filesize 50 equivalent to 3 blocks and thick file 48(b)(0) has a filesize 50 equivalent to 5 blocks, the guaranteed thick block count 72(1) is 8.

The uncompressed mapped thick block count 74(2) for oldest Snapshot 56(2) is the number of mapped blocks 84 used by all thick files 48. Since, in this embodiment there is no compression in use and since thick file 48(a)(2) has 1 mapped block 84, the uncompressed mapped thick block count 74(2) is 1.

The uncompressed mapped thick block count 74(1) for most-recent Snapshot 56(1) is the number of mapped blocks 84 used by all thick files 48. Since, in this embodiment there is no compression in use and since thick file 48(a)(1) has 2 mapped blocks 84 and thick file 48(b)(1) has 4 mapped blocks 84, the uncompressed mapped thick block count 74(1) is 6.

The uncompressed mapped thick block count 74(0) for primary filesystem 46 is the number of mapped blocks 84 used by all thick files 48. Since, in this embodiment there is no compression in use and since thick file 48(a)(0) has 2 mapped blocks 84 and thick file 48(b)(0) has 3 mapped blocks 84, the uncompressed mapped thick block count 74(0) is 5.

The PBR liability for oldest Snapshot 56(2) is 72(2)−74(2)=4−1=3, as shown. The PBR liability for most-recent Snapshot 56(1) is 72(1)−74(1)=11−6=5, as shown. The PBR liability for primary filesystem 46 is 72(0)−74(0)=8−5=3, as shown. In embodiments without compression, the PBR liability is simply the number of unmapped blocks 86 within thick files 48.

Thus, max difference 80 is max(3, 5, 5)=3, as shown. Thus, the volume liability 82 is the stored count of blocks used 64 plus max difference 80, 13+5=18 blocks, as shown.

In another example embodiment with compression, mapped blocks 84 that are compressed are marked in bold. Thus, although 13 mapped blocks 84 have been mapped in total, only 5 of those mapped blocks are uncompressed, while the remaining 8 mapped blocks 84 are stored together in compressed for as 4 compressed mapped blocks 85. Thus, in this embodiment, the stored count of blocks used 64' is 5+4=9, as depicted.

The guaranteed thick block count 72 is the same regardless of whether compression is used, however, the uncompressed mapped thick block count 74 may differ.

The uncompressed mapped thick block count 74'(2) for oldest Snapshot 56(2) is the number of mapped blocks 84 used by all thick files 48, excluding the bold compressed mapped blocks 84. Thus, the uncompressed mapped thick block count 74'(2) is 1.

The uncompressed mapped thick block count 74(1) for most-recent Snapshot 56(1) is the number of mapped blocks 84 used by all thick files 48, excluding the bold compressed mapped blocks 84. Thus, the uncompressed mapped thick block count 74'(1) is 4.

The uncompressed mapped thick block count 74(0) for primary filesystem 46 is the number of mapped blocks 84 used by all thick files 48, excluding the bold compressed mapped blocks 84. Thus, the uncompressed mapped thick block count 74'(0) is 0.

The PBR liability for oldest Snapshot 56(2) is 72'(2)−74'(2)=4−1=3, as shown. The PBR liability for most-recent Snapshot 56(1) is 72'(1)−74'(1)=11−4=7, as shown. The PBR liability for primary filesystem 46 is 72'0)−74'(0)=8−0=8, as shown. In embodiments with compression, the PBR liability is the number of unmapped blocks 86 within thick files 48 plus the number of mapped blocks 84 that are compressed (bold).

Thus, max difference 80' is max(3, 7, 8)=8, as shown. Thus, the volume liability 82' is the stored count of blocks used 64' plus max difference 80', 9+8=17 blocks, as shown.

Figure 3:
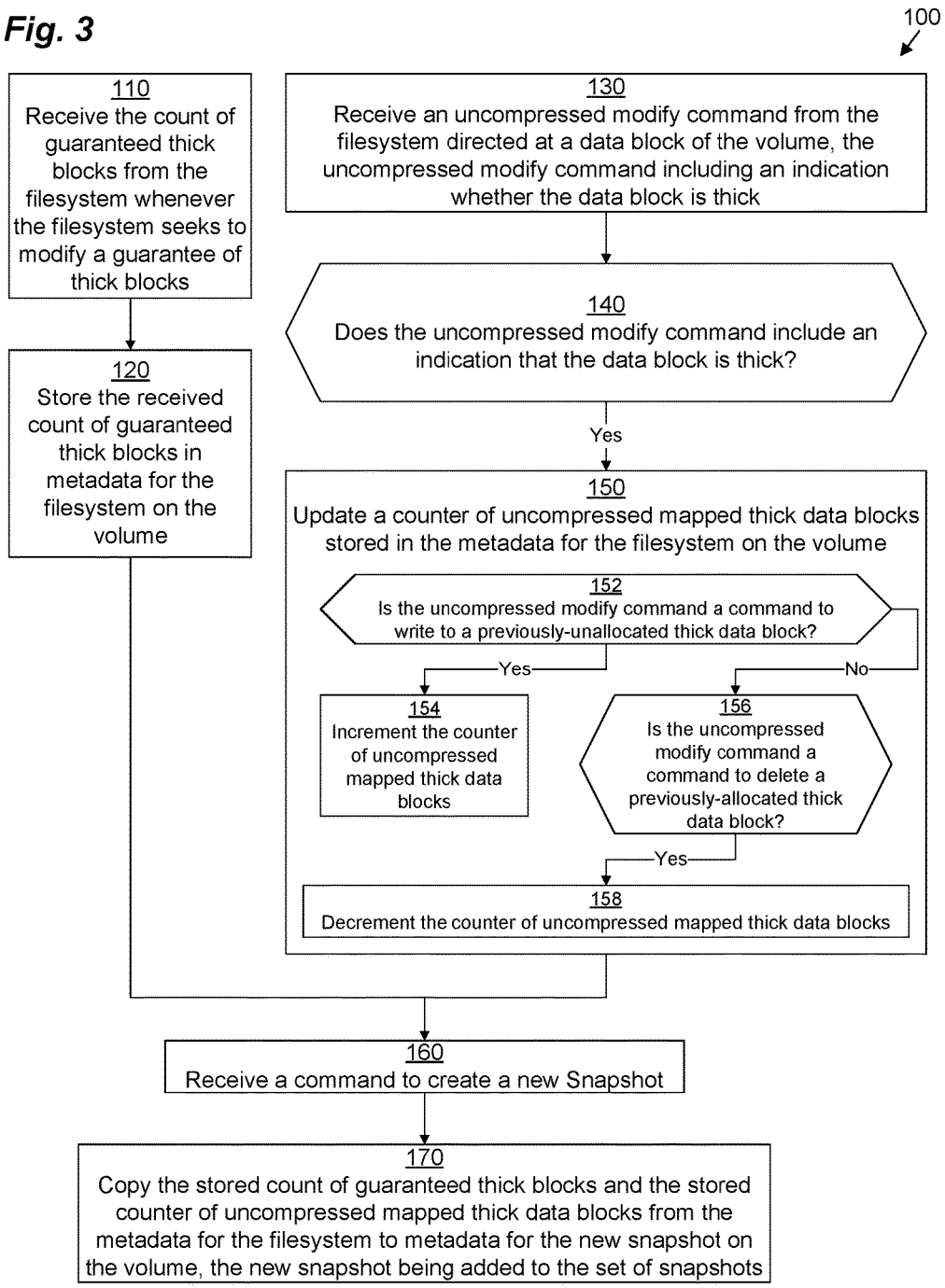
FIG. 3 is a flowchart depicting an example method for use in conjunction with various embodiments.

FIG. 3 illustrates an example method 100 performed by DSS 30. It should be understood that any time a piece of software (e.g., filesystem manager 42, volume management application 61, reservation manager 76, etc.) is described as performing a method, process, step, or function, in actuality what is meant is that a computing device (e.g., DSS 30) on which that piece of software is running performs the method, process, step, or function when executing that piece of software on its processing circuitry 34.

It should be understood that, in some embodiments, one or more steps or sub-steps may be omitted. Similarly, in some embodiments, one or more steps or sub-steps may be combined together or performed in a different order. Method 100 is performed by DSS 30, more specifically by volume management application 61 running on its processing circuitry 34 in conjunction with various other system components.

FIG. 3 represents preliminary operations needed to keep metadata 72, 74 up-to-date within inodes 70. As depicted, steps 110-120 may be performed in parallel with steps 130-150, each of which may be performed zero or more times.

In step 110, volume management application 61 receives the guaranteed thick block count 58 from the filesystem manager 42 whenever the filesystem manager 42 seeks to modify a guarantee of thick blocks. Thus, for example, whenever filesystem manager 42 attempts to change the filesize 50 of a thick file 48, add a new thick file 50 having a non-zero filesize 50, or delete a thick file 48 having a non-zero filesize 50, filesystem manager 42 changes the guaranteed thick block count 58 and sends the updated value to the reservation manager 76.

Then, in step 120, reservation manager 76 stores the received guaranteed thick block count 58 in metadata for the primary filesystem 46 on the logical volume 60 (e.g., as guaranteed thick block count 72(0) within primary inode 70(0).

Steps 110-120 may be performed as often as the filesystem manager 42 attempts to change the guaranteed thick block count 58.

In step 130, volume management application 61 receives an uncompressed modify command from the filesystem manager 42 directed at a data block 66, 68 of the logical volume 60, the uncompressed modify command including an indication whether the data block 66, 68 is thick. Thus, for example, if a user attempts to create a new block, delete a block, or change the contents of any block within any file 48, 54 of the primary filesystem 42, then, as long as compression is not enabled for that block, reservation manager 76 sends a indication down to the logical volume 60 together with the modify command indicating whether the command was directed at a thick file 48 or not.

Then, in step 140, reservation manager 76 determines whether the uncompressed modify command included a thickness indication. If the result of step 140 is affirmative, then operation proceeds with step 150. Otherwise, step 150 is skipped.

In step 150, reservation manager 76 updates an uncompressed mapped thick block count 74(0) stored in the metadata for the filesystem 46 on the logical volume 60 (e.g., within primary inode 70(0)). Step 150 may be performed with reference to sub-steps 152-158.

In sub-step 152, reservation manager 76 determines whether the uncompressed modify command (which has already been determined to be thick) is a command to write to a previously-unallocated data block 68. If the result of sub-step 152 is affirmative, then operation proceeds with sub-step 154. Otherwise, if the result of sub-step 152 is negative, operation proceeds with sub-step 156.

In sub-step 154, since a new uncompressed block is being added to a thick file 48, reservation manager 76 increments the uncompressed mapped thick block count 74(0) within primary inode 70(0)).

In sub-step 156, reservation manager 76 determines whether the uncompressed modify command (which has already been determined to be thick) is a command to delete a previously-allocated data block 66. If the result of sub-step 156 is affirmative, then operation proceeds with sub-step 158. Otherwise, sub-step 158 is skipped.

In sub-step 158, since an existing uncompressed block 66 is being removed from a thick file 48, reservation manager 76 decrements the uncompressed mapped thick block count 74(0) within primary inode 70(0)).

Steps 130-150 may be performed as often as the filesystem manager 42 sends an uncompressed modify command down to the logical volume 60.

In addition, whenever volume management application 61 receives a command to create a new Snapshot (step 160), upon volume management application 61 creating the new Snapshot, reservation manager 76 copies the guaranteed thick block count 72(0) and the uncompressed mapped thick block count 74(0) stored within primary inode 70(0) to be guaranteed thick block count 72($x$) and uncompressed mapped thick block count 74($x$), respectively, stored within Snap inode 70($x$).

Figure 4:
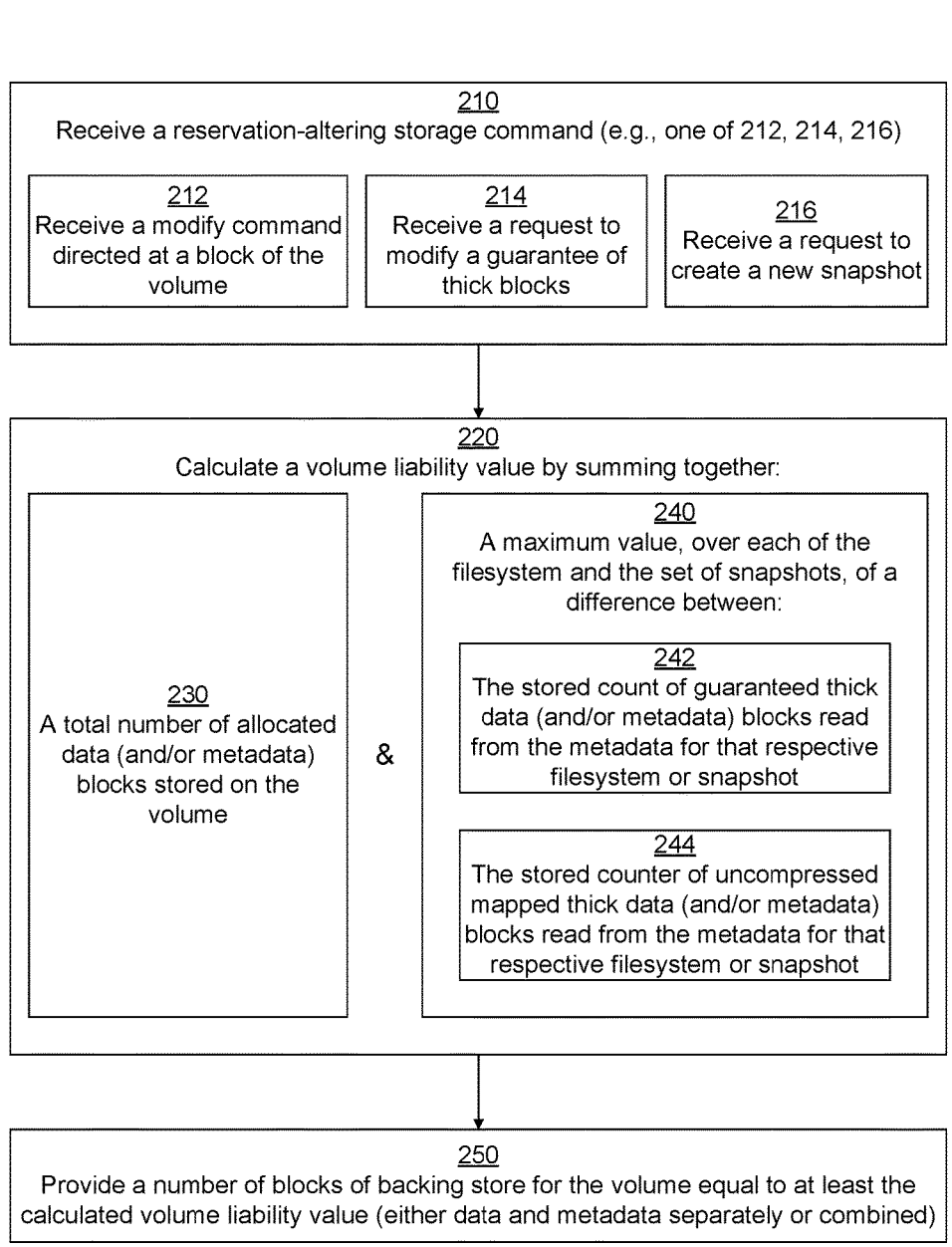
FIG. 4 is a flowchart depicting an example method for use in conjunction with various embodiments.

FIG. 4 illustrates an example method 200 performed by DSS 30. It should be understood that, in some embodiments, one or more steps or sub-steps may be omitted. Similarly, in some embodiments, one or more steps or sub-steps may be combined together or performed in a different order. Method 100 is performed by DSS 30, more specifically by volume management application 61 running on its processing circuitry 34 in conjunction with various other system components.

In step 210, volume management application 61 receives a reservation-altering storage command. Step 210 may be performed with reference to any of sub-steps 212, 214, or 216. Any of these sub-steps may cause the volume liability 82 to change.

In sub-step 212, volume management application 61 receives a modify command directed at a block 66, 68 of the logical volume 60. This may include step 130 from method 100, but it also includes other situations.

In sub-step 214, volume management application 61 receives a request to modify a guarantee of thick blocks from the filesystem manager 42 (equivalent to step 110).

In sub-step 216, volume management application 61 receives a request to create a new Snapshot (equivalent to step 160).

Then, in step 220, reservation manager 76 calculates the volume liability 82 by summing together elements 230 and 240.

Element 230 is a total number of allocated data (and/or metadata) blocks stored on the volume (e.g., the count of blocks used 64 stored within super-block 62).

Element 240 is a maximum value, over each of the primary filesystem 46 and the set of Snapshots 56, of a difference between elements 242 and 244 (i.e., element 242 minus element 244).

Element 242 represents the guaranteed thick block count 72 stored within each inode 70 and element 244 represents the uncompressed mapped thick block count 74 stored within each inode 70. Thus, reservation manager 76 may, for example, iterate from i=0 through the number of Snapshots (e.g., 2) and calculate current difference 78=72($i$)−74($i$) for each value of i, comparing the current difference 78 after each iteration to the max difference 80, and replacing the max difference 80 with the current difference 78 if the current difference 78 exceeds the max difference 80. Upon completing this iterative process, reservation manager 76 computes the sum of the count of blocks used 64 and max difference 80, storing the result as volume liability 82.

Finally, in step 250, reservation manager 76 provides a number of blocks of backing store (e.g., by allocating a slice 38 to the logical volume 60 from persistent storage 36) for the logical volume 60 equal to at least the calculated volume liability 82. In some embodiments, separate counts are maintained for data blocks and metadata blocks of primary filesystem 46 and Snapshots 56 so that two different volume liabilities 82 are generated, allowing the reservation manager 76 to allocate slices 38 from different storage tiers for data and metadata in the appropriate relative quantities. In other embodiments, data blocks and metadata blocks are counted together.

Figure 5:
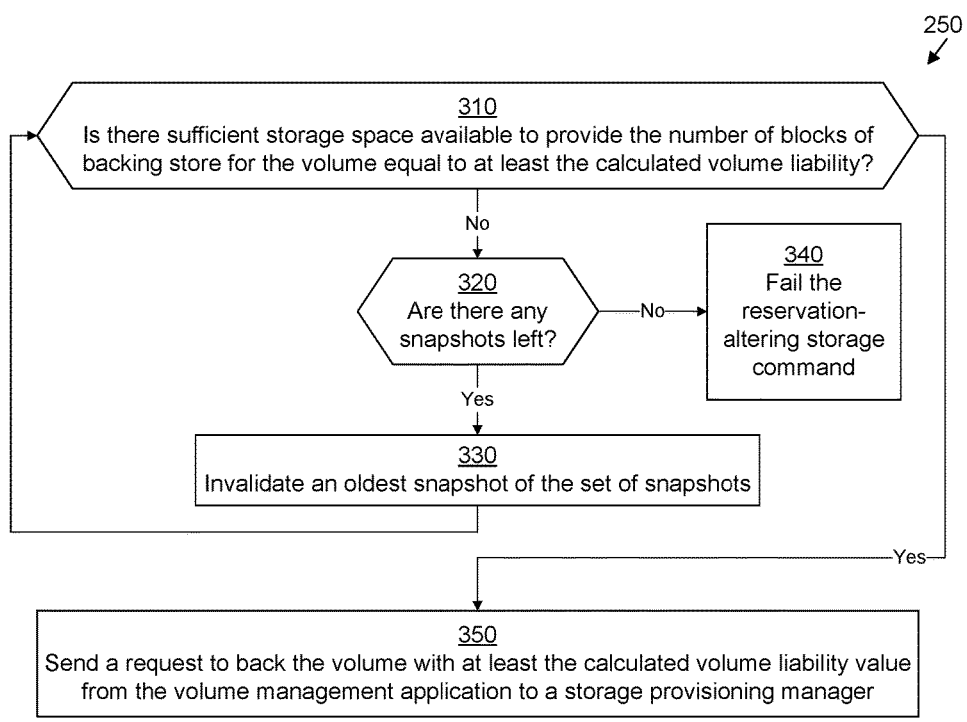
FIG. 5 is a flowchart depicting an example method for use in conjunction with various embodiments.

FIG. 5 illustrates step 250 in more detail according to one example embodiment.

In step 310, reservation manager 76 determines if there is sufficient storage space available (e.g., within logical volume 60 plus any available slices 38) to provide the number of blocks of backing store for the logical volume 60 equal to at least the calculated volume liability 82. If the result of step 310 is affirmative, then operation proceeds with step 350. Otherwise, if the result of step 310 is negative, operation proceeds with step 320.

In step 320, reservation manager 76 determines if there are any Snapshots 56 still extant. If the result of step 320 is affirmative, then operation proceeds with step 330. Otherwise, if the result of step 320 is negative, operation proceeds with step 340.

In step 330, reservation manager 76 invalidates an oldest snapshot 56 (e.g, snapshot 56(2)), with operation looping back to step 310. Thus, Snapshots 56 are successively invalidated to free space until there are none left (if necessary).

Operation eventually either terminates with step 340 in which the reservation-altering storage command fails due to lack of backing store or with step 359 in which reservation manager 76 sends a request to back the logical volume 60 with at least the calculated volume liability 82 to a storage provisioning manager (not depicted) in order to actually effectuate the provision of slices 38 to the logical volume 60.

Thus, techniques for more efficiently provisioning storage to filesystems 46 employing PBR without wasting space have been provided.

These techniques work in conjunction with inline data compression. This may be accomplished by summing a number 64 of allocated blocks with a maximum PBR liability 80 for a primary filesystem 46 or any of its Snapshots 56 and using that sum 82 to efficiently reserve space on a logical volume 60 for the primary filesystem 46 and its Snapshots 56.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of operating a data storage system (DSS) to provision space on a volume on which a filesystem and a set of snapshots of the filesystem rest, the filesystem including both files marked as thick and files marked as thin, the method comprising:
   receiving from the filesystem, by a volume management application operating on the DSS, a reservation-altering storage command;
   in response to receiving the reservation-altering storage command, calculating, by the volume management application operating on the DSS, a volume liability value by summing together:
      a total number of allocated data blocks stored on the volume; and
      a maximum value, over each of the filesystem and the set of snapshots, of a difference between:
         a count of guaranteed thick blocks for that respective filesystem or snapshot, the count of guaranteed thick blocks for that respective filesystem or snapshot being based on a count of guaranteed thick blocks received from the filesystem, the count of guaranteed thick blocks including a sum, over each file marked as thick on the filesystem, of data blocks guaranteed to that file based on a filesize of that file; and
         a number of uncompressed mapped data blocks marked as thick by the filesystem for that respective filesystem or snapshot;
   providing, by the volume management application operating on the DSS, a number of blocks of backing store for the volume equal to at least the calculated volume liability value;
   receiving, by the volume management application operating on the DSS, an uncompressed modify command from the filesystem directed at a data block of the volume, the uncompressed modify command including an indication whether the data block is thick; and
   in response to receiving the uncompressed modify command, conditional upon the uncompressed modify command including an indication that the data block is thick, updating, by the volume management application operating on the DSS, a counter of uncompressed mapped data blocks stored in the metadata for the filesystem on the volume;
   wherein calculating the volume liability value includes reading the stored counter of uncompressed mapped data blocks in the metadata for each respective filesystem and snapshot.

2. The method of claim 1 wherein receiving the reservation-altering storage command includes receiving one of (1) a modify command directed at a block of the volume, (2) a request to modify a guarantee of thick blocks, and (3) a request to create a new snapshot.

3. The method of claim 1 wherein:
   the method further comprises:
      receiving, by the volume management application operating on the DSS, the count of guaranteed thick blocks from the filesystem whenever the filesystem seeks to modify a guarantee of thick blocks; and
      in response to receiving the count of guaranteed thick blocks, storing, by the volume management application operating on the DSS, the received count of guaranteed thick blocks in metadata for the filesystem on the volume; and calculating the volume liability value further includes reading the stored count of guaranteed thick blocks in the metadata for each respective filesystem and snapshot.

4. The method of claim 3 wherein the method further comprises:

upon a new snapshot of the filesystem being created, copying, by the volume management application operating on the DSS, the stored count of guaranteed thick blocks from the metadata for the filesystem to metadata for the new snapshot on the volume, the new snapshot being added to the set of snapshots.

5. The method of claim 1 wherein the method further comprises:

upon a new snapshot of the filesystem being created, copying, by the volume management application operating on the DSS, the stored counter of uncompressed mapped data blocks from the metadata for the filesystem to metadata for the new snapshot on the volume, the new snapshot being added to the set of snapshots.

6. The method of claim 1 wherein updating the counter of uncompressed mapped data blocks stored in the metadata for the filesystem on the volume includes:

selectively incrementing the counter of uncompressed mapped data blocks stored in the metadata for the filesystem on the volume in response to the uncompressed modify command being a command to write to a previously-unallocated thick data block; and selectively decrementing the counter of uncompressed mapped blocks stored in the metadata for the filesystem on the volume in response to the uncompressed modify command being a command to delete a previously-allocated thick data block.

7. The method of claim 1 wherein providing the number of blocks of backing store for the volume equal to at least the calculated volume liability value includes:

sending a request to back the volume with at least the calculated volume liability value from the volume management application operating on the DSS to a storage provisioning manager;

in response to sending the request to the storage provisioning manager, receiving, by the volume management application operating on the DSS, a response message from the storage provisioning manager, the response message indicating whether or not the request was successful; and selectively performing a freeing operation in response to the response message indicating that the request was not successful, the freeing operation including:
invalidating an oldest snapshot of the set of snapshots;
repeating the request to back the volume with at least the calculated volume liability value; and
repeating until the freeing operation succeeds.

8. The method of claim 1 wherein:
the method further comprises:
in response to receiving the reservation-altering storage command, calculating, by the volume management application operating on the DSS, a metadata-specific volume liability value by summing together:
a total number of allocated metadata blocks stored on the volume; and
a maximum value, over each of the filesystem and the set of snapshots, of a difference between:

a count of guaranteed thick metadata blocks for that respective filesystem or snapshot, the count of guaranteed thick metadata blocks for that respective filesystem or snapshot being based on a count of guaranteed thick metadata blocks received from the filesystem, the count of guaranteed thick metadata blocks including a sum, over each file marked as thick on the filesystem, of metadata blocks guaranteed to that file based on a filesize of that file; and
a number of uncompressed mapped metadata blocks marked as thick by the filesystem for that respective filesystem or snapshot; and
providing, by the volume management application operating on the DSS, a number of blocks of backing store for metadata blocks of the filesystem on the volume equal to at least the calculated metadata-specific volume liability value; and
providing the number of blocks of backing store for the volume equal to at least the calculated volume liability value includes providing the number of blocks of backing store for data blocks of the filesystem on the volume.

9. The method of claim 1 wherein:
the method further comprises, in response to receiving the reservation-altering storage command, calculating, by the volume management application operating on the DSS, a metadata-specific volume liability value by summing together:
a total number of allocated metadata blocks stored on the volume; and
a maximum value, over each of the filesystem and the set of snapshots, of a difference between:
a count of guaranteed thick metadata blocks for that respective filesystem or snapshot, the count of guaranteed thick metadata blocks for that respective filesystem or snapshot being based on a count of guaranteed thick metadata blocks received from the filesystem, the count of guaranteed thick metadata blocks including a sum, over each file marked as thick on the filesystem, of metadata blocks guaranteed to that file based on a filesize of that file; and
a number of uncompressed mapped metadata blocks marked as thick by the filesystem for that respective filesystem or snapshot; and
providing the number of blocks of backing store for the volume equal to at least the calculated volume liability value includes providing the number of blocks of backing store for both data blocks and metadata blocks of the filesystem on the volume, the number being equal to at least the calculated volume liability value plus the calculated metadata-specific volume liability value.

10. An apparatus comprising:
data storage providing backing store for a volume on which a filesystem and a set of snapshots of the filesystem rest, the filesystem including both files marked as thick and files marked as thin; and
processing circuitry coupled to memory configured to provision space on the volume by:
receiving from the filesystem, by a volume management application operating on the apparatus, a reservation-altering storage command;
in response to receiving the reservation-altering storage command, calculating, by the volume management application operating on the apparatus, a volume liability value by summing together:
- a total number of allocated data blocks stored on the volume; and
- a maximum value, over each of the filesystem and the set of snapshots, of a difference between:
  - a count of guaranteed thick blocks for that respective filesystem or snapshot, the count of guaranteed thick blocks for that respective filesystem or snapshot being based on a count of guaranteed thick blocks received from the filesystem, the count of guaranteed thick blocks including a sum, over each file marked as thick on the filesystem, of data blocks guaranteed to that file based on a filesize of that file; and
  - a number of uncompressed mapped data blocks marked as thick by the filesystem for that respective filesystem or snapshot;

providing, by the volume management application operating on the apparatus, a number of blocks of backing store for the volume equal to at least the calculated volume liability value;

receiving, by the volume management application operating on the apparatus, an uncompressed modify command from the filesystem directed at a data block of the volume, the uncompressed modify command including an indication whether the data block is thick; and in response to receiving the uncompressed modify command, conditional upon the uncompressed modify command including an indication that the data block is thick, updating, by the volume management application operating on the apparatus, a counter of uncompressed mapped data blocks stored in the metadata for the filesystem on the volume;

wherein calculating the volume liability value includes reading the stored counter of uncompressed mapped data blocks in the metadata for each respective filesystem and snapshot.

11. A computer program product comprising a non-transitory computer-readable storage medium storing a set of instructions, which, when executed by processing circuitry of a data storage system (DSS), cause the DSS to provision space on a volume on which a filesystem and a set of snapshots of the filesystem rest, the filesystem including both files marked as thick and files marked as thin, the method comprising:

receiving from the filesystem, by a volume management application operating on the DSS, a reservation-altering storage command;

in response to receiving the reservation-altering storage command, calculating, by the volume management application operating on the DSS, a volume liability value by summing together:
- a total number of allocated data blocks stored on the volume; and
- a maximum value, over each of the filesystem and the set of snapshots, of a difference between:
  - a count of guaranteed thick blocks for that respective filesystem or snapshot, the count of guaranteed thick blocks for that respective filesystem or snapshot being based on a count of guaranteed thick blocks received from the filesystem, the count of guaranteed thick blocks including a sum, over each file marked as thick on the filesystem, of data blocks guaranteed to that file based on a filesize of that file; and
  - a number of uncompressed mapped data blocks marked as thick by the filesystem for that respective filesystem or snapshot;

providing, by the volume management application operating on the DSS, a number of blocks of backing store for the volume equal to at least the calculated volume liability value;

receiving, by the volume management application operating on the DSS, an uncompressed modify command from the filesystem directed at a data block of the volume, the uncompressed modify command including an indication whether the data block is thick; and in response to receiving the uncompressed modify command, conditional upon the uncompressed modify command including an indication that the data block is thick, updating, by the volume management application operating on the DSS, a counter of uncompressed mapped data blocks stored in the metadata for the filesystem on the volume;

wherein calculating the volume liability value includes reading the stored counter of uncompressed mapped data blocks in the metadata for each respective filesystem and snapshot.

\* \* \* \* \*